June 10, 1930.  W. F. HILD  1,763,465
SIGNAL MECHANISM FOR AUTOMOBILES
Filed Sept. 10, 1926   2 Sheets-Sheet 1

WITNESSES:

INVENTOR
William F. Hild.
BY
ATTORNEYS

June 10, 1930. W. F. HILD 1,763,465
SIGNAL MECHANISM FOR AUTOMOBILES
Filed Sept. 10, 1926 2 Sheets-Sheet 2
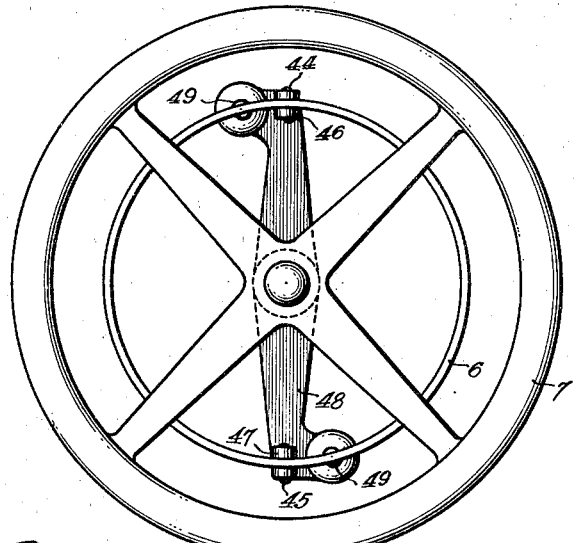
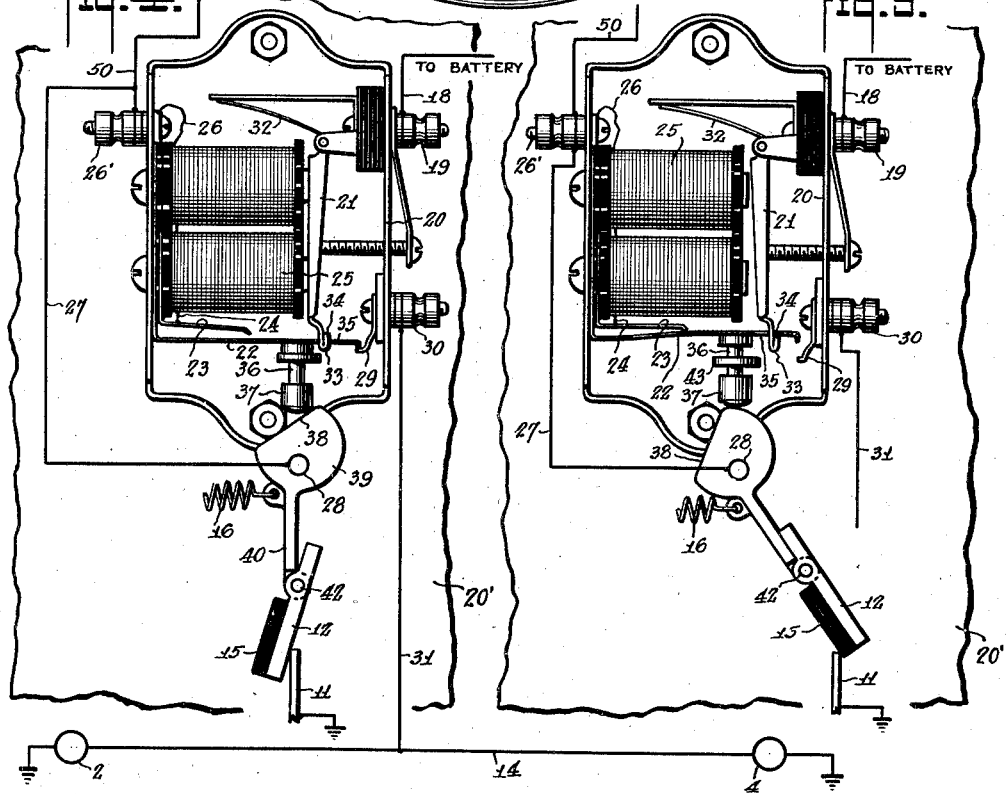
INVENTOR
*William F. Hild.*
BY
ATTORNEYS Patented June 10, 1930

1,763,465

UNITED STATES PATENT OFFICE

WILLIAM F. HILD, OF EAST RUTHERFORD, NEW JERSEY

SIGNAL MECHANISM FOR AUTOMOBILES

Application filed September 10, 1926. Serial No. 134,730.

This invention relates to signalling devices and particularly to an improved signal mechanism for automobiles whereby persons in the front and rear of the automobile may be notified when the machine is turning.

Another object of the invention is to provide a mechanism for automobiles for automatically lighting the lamps at the front and rear for indicating turning, the automatic lighting mechanism being associated with manually actuated mechanism for causing said signalling lamps to function before the turning operation begins.

A further object of the invention is to provide a pair of signalling lamps at the front and also a pair of signalling lamps at the rear of an automobile with automatic and manually actuated means independently functioning for lighting said lamps in different sequences to indicate a turning motion or indicate that a turn is about to be made.

In the accompanying drawings—

Figure 3 is a top plan view on an enlarged scale, of the wheel, switches and associated parts shown in Figure 2.

Figure 4 is an enlarged elevation of one of the automatic switch mechanisms embodying certain features of the invention.

Figure 5 is a view similar to Figure 4 showing the same mechanism in a different position.

Figure 1:
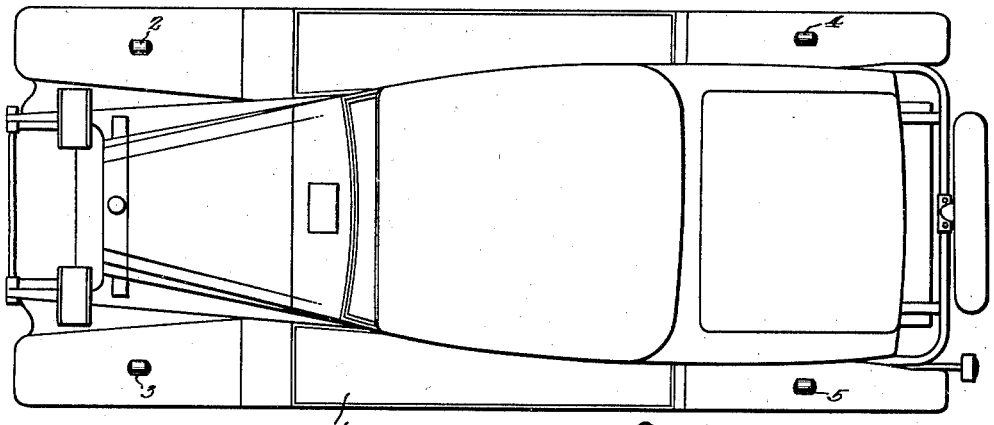
Figure 1 is a top plan view of an automobile provided with a signalling mechanism disclosing an embodiment of the invention.

Referring to the accompanying drawings by numerals, 1 indicates an automobile of any desired kind provided with lamps 2 and 3 at the front and lamps 4 and 5 at the rear, said lamps being adapted to be placed at any desired points at the front and rear. The rear lamps face to the rear and the front lamps face and shine to the front only. These lamps are connected to certain mechanism hereinafter fully described whereby when the automobile is turned either to the right or left, current will be supplied to certain of these lamps. For instance, if the automobile is turned to the right, current will be supplied to lamps 2 and 4 while if turned to the left, current will be supplied to lamps 3 and 5. Sometimes it is desirable to indicate in advance which way the automobile is to turn and when this is the case the ring 6 is tilted in the desired direction by one of the hands grasping the wheel 7 and the circuit of certain of the lamps will be closed.

Figure 2:
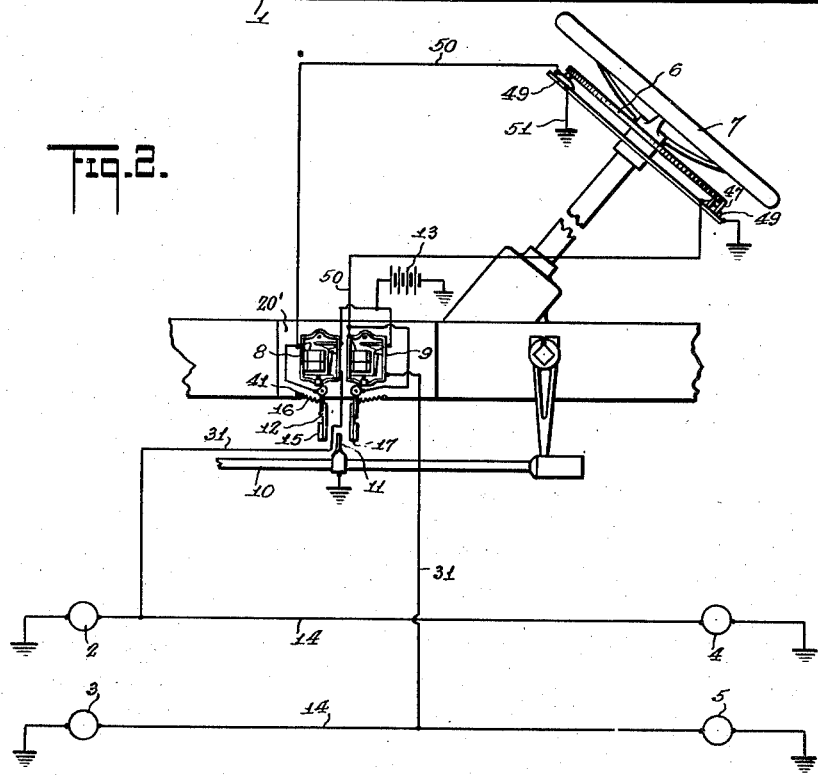
Figure 2 is an enlarged fragmentary view showing in diagram an embodiment of the invention disclosed in Figure 1.

As indicated in Figure 2, there are provided automatic switches 8 and 9 adapted to function according to which direction the automobile is turning. When the wheel 7 is turned for causing the automobile to turn to the right, the mechanism of the automobile will be moved for shifting rod 10 to the left as shown in Figure 2. This will cause the abutment 11, rigidly secured to rod 10, to come in contact with the swinging contact 12. When this has been done the switch mechanism 8 will function whereby the source of current, as for instance, battery 13, will be connected to the wire or conductor 14 which is in circuit with the lamps 2 and 4. As one side of these lamps is grounded and one side of battery 13 is grounded, these lamps will be lighted when switch mechanism 8 has been caused to function. In turning a corner, abutment 11 will move forwardly until it passes the swinging contact 12 and on its return movement will strike the insulating plate 15 and swing contact 12 and associated parts back to the original position and in fact, beyond the original position which will cause the mechanism hereinafter fully described to throw out of operation switch mechanism 8 and also to open the circuit of lamps 2 and 4. As soon as the abutment 11 has moved back as described, the spring 16 will quickly swing the contact 12 and associated parts to a normally vertical position. When the wheel 7 is turned for turning the automobile to the left, a similar action will take place except in respect to the switch mechanism 9 and the contact 17. Ordinarily, during the steering of the automobile, abutment 11 will move back and forth in the space between contacts 12 and 17 and, therefore, will produce no results as far as the signalling mechanism is concerned. When the abutment 11 has been moved over into engagement with contact 12 as shown in Figure 4, the circuit of lamps 2 and 4 will be closed as just described. When this occurs, current will pass from the battery 13 through wire 18 to binding post 19 which is insulated from the casing 20. From binding post 19 current will pass to the armature 21, which at this time, is in the position shown in Figure 5. Current leaving binding post 19 will pass through armature 21 to the spring 22 and from thence through the spring contact 23, which spring contact is connected by wire 24 to the windings of the tubular magnets 25. These magnets have their opposite terminal connected through wire 26 to the post 26′, which post is insulated from casing 20. Post 26′ is connected through wire 27 to the pivotal pin 28 which is carried by panel 20′ and is, therefore, insulated from the casing 20 and from the car. It will thus be seen that current will, therefore, pass from the battery 13 to wire 18, post 19, armature 21, spring 22, spring contact 23, connecting wire 24, coils 25, wire 26, wire 27, pin 28 and from thence through abutment 11 to the ground. Current passing in this circuit will naturally energize the cores of magnets 25 and will, therefore, attract the armature 21 so that it will move to the position shown in Figure 4. This will allow the spring 22 to move downwardly and firmly press against the contact 29 whereby current can pass from the armature 21, through spring 22, contact 29, binding post 30 and wire 31 to wire or conductor 14 and from thence to the lamps 2 and 4 and then back through the ground to the battery. It will be noted that armature 21 is an ordinary spring pressed armature and will ordinarily assume the position shown in Figure 5 by reason of the spring 32. The lower end of armature 21 is provided with a turned over portion 33 whereby a shoulder 34 is presented adapted to overlap and engage part of the spring 22 when the parts are in the position shown in Figure 5. It will be noted that spring 22 is provided with a slot 35 whereby when armature 21 is swung by the magnets 25, the extension 33 will merely swing in the slot 35 and allow the spring 22 to move downwardly to the position shown in Figure 4. This will close the circuit of contact 29 and open the circuit at spring contact 23. Spring contact 22 is provided with a rod 36 supplied with an insulating knob 37 adapted to be engaged by the cam face 38 of cam 39. This cam is pivotally mounted on pin 28 which is supported by a member formed of insulation. Spring 16 is connected with the extension 40 of cam 39 and with a suitable post 41 insulated from the ground whereby the parts will normally remain in the position shown in Figure 4. Contact 12 is pivotally mounted at 42 on extension 40 and carries on one face an insulating block 15. By this arrangement, whenever the abutment 11 comes into engagement with the contact 12, the circuit through the magnets 25 will be closed and later the circuit through the lamps will be closed. Contact 12 is pivotally mounted in order that the abutment 11 may travel forwardly a sufficient distance to allow a turn of forty-five degrees. A return movement of abutment 11 will swing contact 12, extension 40 and associated parts to the position shown in Figure 5 whereupon the cam face 38 is caused to act on the insulated head 37 for raising spring 22. When this has been done, spring 32 will swing armature 21 to the position shown in Figure 5. It will be noted that the guiding member 43 is supplied for guiding the rod 36 in its up and down movement, said guiding member being a U-shaped structure or an eye as preferred. The movement of the abutment 11 continues from that shown in Figure 5 until it slips off of the insulating block 15 and assumes for instance, a central position as shown in Figure 2. It is then in position for repeating the operation by another turn to the right or duplicating the operation by a turn to the left.

When a left turn is made, switch 9 and associated parts which are identical with switch 8 and associated parts, will be caused to function as described in regard to switch 8. It will thus be seen that whenever a right or left hand turn is made, either the lamps 2 and 4 or the lamps 3 and 5 may be lighted as the turn is being made and then turned out when the turn has been completed. Under some circumstances it is desirable to light the signalling lamps before the turn is started. When this is the case, the ring 6 is operated. For instance, if it should be desired to indicate that a right turn is to be made, the right hand portion as seen in Figure 3 will be raised or moved toward the wheel 7. The ring 6 is pivotally mounted on suitable pivotal members 44 and 45 carried by suitable ears 46 and 47 rigidly secured to or formed integral with the plate 48 secured to the stationary part of the steering column. When the ring 6 has been swung as just described, part of the same will press against the button 49, said button being an ordinary push button having suitable contacts therein whereby the circuit between the wires 50 and 51 is closed. Wire 51 is connected with the ground and wire 50 is connected to binding post 26′. When a left hand turn is to be made, the left hand portion of the ring 6 is tilted toward the wheel 7 and the circuit will be closed through the other button 49.

When the circuit is closed as just described, current will pass from battery 13 through wire 18, binding post 19, armature 21, spring 22, spring contact 23, windings 25, wire 26, binding post 26′, wire 50, push button 49, wire 51 and from thence to the ground and through the ground back to the battery. This will cause the armature 21 to move over to the position shown in Figure 4 and the circuits of the lamps 2 and 4 are closed. The right turn then may be made and as the parts are brought back to a straight line position, abutment 11 will open the circuit as heretofore described by shifting the parts to the position shown in Figure 5.

What I claim is:

1. In an electrical signal a magnet circuit, a signal circuit having electrical connection with a signal, a source of electrical energy connected with the two circuits, an electrical magnet in the magnet circuit, a contact electrically connected with the electro-magnet, a movable contact adjacent the first contact, cooperating means between the armature of the magnet and the movable contact for normally holding the latter against the first mentioned contact, a switch in the signal circuit and operable to energize the electro-magnet to render such means inoperative to permit the movable contact to become disengaged from the first mentioned contact and establish electrical connection with one conductor of the magnet circuit, and a grounded contact operable to establish electrical connection with the other conductor of the magnet circuit whereby to establish an electrical circuit through the electro-magnet to the signal.

2. In an electrical signal, a magnet circuit, a signal circuit having electrical connection with an electrical signal, a source of electrical energy connected with the two circuits, an electro-magnet in the magnet circuit, a contact in circuit with the electro-magnet, a second contact in the magnet circuit, a switch member movable between the two contacts, cooperating means between the armature of the magnet and the switch member for holding the latter against the first mentioned of such contacts, a manually operable switch in the signal circuit and operable to energize the electro-magnet to permit the movable contact to engage the second contact, a grounded contact movable with part of a steering mechanism and operable to complete a circuit to the signal upon actuation of the steering mechanism to make a turn.

3. In an electrical signal, a magnet circuit, a signal circuit having electrical connection with an electrical signal, a source of electrical energy connected with the two circuits, an electro-magnet in the magnet circuit, a contact in circuit with the electro-magnet, a second contact in the magnet circuit, a switch member movable between the two contacts, cooperating means between the armature of the magnet and the switch member for holding the latter against the first mentioned of such contacts, a manually operable switch in the signal circuit and operable to energize the electro-magnet to permit the movable contact to engage the second contact, a plunger reciprocable beneath the movable contact and having an insulated end, a cam upon which the insulated end of the plunger rests and having electrical connection with the electro-magnet, an arm depending from the cam, a reciprocating contact in the path of the arm and operable to complete a circuit to the signal through the cam upon movement in one direction, movement of the reciprocating contact in the opposite direction serving to actuate the cam to move the plunger against the movable contact to reset the latter.

4. In an electrical apparatus, a magnet circuit, a signal circuit, a source of electrical energy connected with the two circuits, an electro-magnet in the magnet circuit, spaced contacts, one of which being connected with the electro-magnet and the other being connected with the signal circuit, a movable contact between the spaced contacts, a latch element carried by the armature of the magnet and normally engaged with the movable contact to hold the same against the contact connected with the electro-magnet, a manually operable switch in circuit with the electro-magnet and operable to disengage the latch element from the movable contact and permit the latter to engage the other contact, a cam supported below the movable contact, and having electrical connection with the electro-magnet, a pivoted member carried by the cam and having one face insulated, and a reciprocable grounded contact in the path of the pivoted member and engageable with one face of the pivoted member to complete an electrical circuit, and engageable with the opposite face to actuate the cam to reset the movable contact.

WILLIAM F. HILD.